US012798205B2

(12) United States Patent
Rao

(10) Patent No.: US 12,798,205 B2
(45) Date of Patent: Nov. 17, 2026

(54) MOLDS FOR PRODUCTION OF OPHTHALMIC DEVICES

(71) Applicant: Bausch + Lomb Ireland Limited, Dublin (IE)

(72) Inventor: Arvind M. Rao, Rochester, NY (US)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 323 days.

(21) Appl. No.: 17/679,229

(22) Filed: Feb. 24, 2022

(65) Prior Publication Data

US 2022/0281192 A1 Sep. 8, 2022

Related U.S. Application Data

(60) Provisional application No. 63/157,130, filed on Mar. 5, 2021.

(51) Int. Cl.
*B29D 11/00* (2006.01)
*B29C 33/38* (2006.01)

(52) U.S. Cl.
CPC .... *B29D 11/00125* (2013.01); *B29C 33/3842* (2013.01); *B29D 11/0048* (2013.01); *B29K 2823/12* (2013.01); *B29K 2896/04* (2013.01)

(58) Field of Classification Search
CPC ........... B29C 33/3842; B29D 11/00125; F26B 2200/08; B29B 13/065
See application file for complete search history.

(56) References Cited

U.S. PATENT DOCUMENTS 3,834,038 A * 9/1974 Janda .................... B29B 13/065
219/686
4,113,224 A 9/1978 Clark et al.
4,121,896 A 10/1978 Shephard
(Continued)

FOREIGN PATENT DOCUMENTS

CN 1351537 A 5/2002
EP 0785854 B1 1/1999
(Continued)

OTHER PUBLICATIONS

Pete Stoughton, "Why Drying Polyolefins Might Be Right for Your Process", https://www.ptonline.com/articles/why-drying-polyolefins-might-be-right-for-your-process#:~:text=Polymers%20of%20all%20kinds%20can,that%20occur%20throughout%20the%20year, Jan. 2, 2018. (Year: 2018).*
(Continued)

*Primary Examiner* — Ariella Machness
(74) *Attorney, Agent, or Firm* — Michael E. Carmen; John E. Thomas

(57) ABSTRACT

A method includes subjecting an ophthalmic device mold-forming material to drying conditions in a first inert gas environment for a time period sufficient to substantially dry the ophthalmic device mold-forming material; molding a first ophthalmic device mold part and a second ophthalmic device mold part from the dried ophthalmic device mold-forming material; and subjecting the first ophthalmic device mold part and the second ophthalmic device mold part to a second inert gas environment for a time period sufficient to substantially remove all oxygen in the first ophthalmic device mold part and the second ophthalmic device mold part.

13 Claims, 4 Drawing Sheets

(56) References Cited

U.S. PATENT DOCUMENTS

| | | | | |
|---|---|---|---|---|
| 4,136,250 | A | | 1/1979 | Mueller et al. |
| 4,153,641 | A | | 5/1979 | Deichert et al. |
| 4,208,364 | A | | 6/1980 | Shephard |
| 4,208,365 | A | | 6/1980 | LeFevre |
| 4,740,533 | A | | 4/1988 | Su et al. |
| 4,910,277 | A | | 3/1990 | Bambury et al. |
| 4,954,587 | A | | 9/1990 | Mueller |
| 5,010,141 | A | | 4/1991 | Mueller |
| 5,034,461 | A | | 7/1991 | Lai et al. |
| 5,070,215 | A | | 12/1991 | Bambury et al. |
| 5,079,319 | A | | 1/1992 | Mueller |
| 5,260,000 | A | | 11/1993 | Nandu et al. |
| 5,310,779 | A | | 5/1994 | Lai |
| 5,321,108 | A | | 6/1994 | Kunzler et al. |
| 5,358,995 | A | | 10/1994 | Lai et al. |
| 5,387,662 | A | | 2/1995 | Kunzler et al. |
| 5,449,729 | A | | 9/1995 | Lai |
| 5,512,205 | A | | 4/1996 | Lai |
| 5,610,252 | A | | 3/1997 | Bambury et al. |
| 5,616,757 | A | | 4/1997 | Bambury et al. |
| 5,681,510 | A | * | 10/1997 | Valint, Jr. ........ B29D 11/00125 264/102 |
| 5,708,094 | A | | 1/1998 | Lai et al. |
| 5,710,302 | A | | 1/1998 | Kunzler et al. |
| 5,714,557 | A | | 2/1998 | Kunzler et al. |
| 5,753,150 | A | * | 5/1998 | Martin .................. B29C 37/006 264/85 |
| 5,843,346 | A | * | 12/1998 | Morrill ............ B29D 11/00076 425/808 |
| 5,908,906 | A | | 6/1999 | Kunzler et al. |
| 6,039,899 | A | * | 3/2000 | Martin ............... B29D 11/0023 425/347 |
| 6,444,145 | B1 | | 9/2002 | Clutterbuck |
| 6,551,531 | B1 | | 4/2003 | Ford et al. |
| 7,320,587 | B2 | | 1/2008 | Goodenough et al. |
| 7,581,943 | B2 | | 9/2009 | Goodenough et al. |
| 7,625,197 | B2 | * | 12/2009 | Duis ................ B29D 11/00125 220/264 |
| 7,731,148 | B2 | | 6/2010 | Turner et al. |
| 10,830,923 | B2 | * | 11/2020 | Qiu .......................... B65B 55/22 |
| 2008/0239237 | A1 | * | 10/2008 | Ansell .............. B29D 11/00038 264/1.36 |
| 2009/0108478 | A1 | * | 4/2009 | Lawton ............ B29D 11/00125 264/225 |
| 2016/0075053 | A1 | * | 3/2016 | Martin .................... B29B 9/065 34/92 |

FOREIGN PATENT DOCUMENTS

| | | | | |
|---|---|---|---|---|
| JP | H01235604 | A | * | 9/1989 |
| JP | 4687206 | B2 | | 5/2011 |
| WO | 9611782 | A1 | | 4/1996 |
| WO | 9631792 | A1 | | 10/1996 |
| WO | PCT/EP2022/054644 | | | 7/2022 |

OTHER PUBLICATIONS

Lai, Yu-Chin, "The Role of Bulky Polysiloxanylalkyl Methacryates in Polyurethane-Polysiloxane Hydrogels," Journal of Applied Polymer Science, 1996, pp. 1193-1199, vol. 60.

European Patent Application No. 22 710 982.4, Communication dated Nov. 19, 2025, 8 pages.

* cited by examiner

MOLDS FOR PRODUCTION OF OPHTHALMIC DEVICES

PRIORITY CLAIM

The present application claims priority to U.S. Provisional Patent Application Ser. No. 63/157,130, entitled "Molds for Production of Ophthalmic Devices," filed Mar. 5, 2021, the content of which is incorporated by reference herein in its entirety.

BACKGROUND

Contact lenses have been manufactured by a variety of methods, including lathing, and cast molding. Lathing is not able to meet the demands of high-volume, and fast production. Efforts to reduce the inherent cost disadvantages of lathing have produced a process that is a hybrid of lathing and cast molding. For example, lenses may be prepared by casting one side of the lens and lathing the other side. This process is less expensive than lathing, but not as cheap as a complete cast molding process.

Cast molding requires the use of two complementary molds. The anterior mold half defines the anterior surface of the lens. The posterior mold half defines the posterior surface of the lens. Mold halves are traditionally used only once and then serve as an element of the packaging for the finished lenses or they are discarded. In order to manufacture contact lens mold halves of a desired radius or power, posterior and anterior step tools are used to produce a batch of baseline molds. The baseline molds are measured for accuracy, and a series of step changes must then be made until the desired dimensions are achieved in the resulting mold halves. The desired final lens product determines the design of the necessary posterior and anterior mold halves.

For example, contact lenses are generally molded by depositing a curable liquid into a mold cavity defined by two mold halves. These molds are often disposable, and the cost to replace the mold for each new lens is a significant part of the total cost of the final lens. The liquid is then cured within the mold cavity. Following the curing process, the cured lenses are removed from the mold cavity. The lenses will then typically move through other post curing steps to produce a finished lens.

SUMMARY

In accordance with an illustrative embodiment, a method comprises (a) subjecting an ophthalmic device mold-forming material to drying conditions in a first inert gas environment for a time period sufficient to substantially dry the ophthalmic device mold-forming material; (b) molding a first ophthalmic device mold part and a second ophthalmic device mold part from the dried ophthalmic device mold-forming material; and (c) subjecting the first ophthalmic device mold part and the second ophthalmic device mold part to a second inert gas environment for a time period sufficient to substantially remove all oxygen in the first ophthalmic device mold part and the second ophthalmic device mold part.

In accordance with another illustrative embodiment, a system comprises at least one processing device comprising a processor coupled to a memory. The at least one processing device is configured to implement the steps of (a) subjecting an ophthalmic device mold-forming material to drying conditions in a first inert gas environment for a time period sufficient to substantially dry the ophthalmic device mold-forming material; (b) molding a first ophthalmic device mold part and a second ophthalmic device mold part from the dried ophthalmic device mold-forming material; and (c) subjecting the first ophthalmic device mold part and the second ophthalmic device mold part to a second inert gas environment for a time period sufficient to substantially remove all oxygen in the first ophthalmic device mold part and the second ophthalmic device mold part.

In accordance with yet another illustrative embodiment, an article of manufacture comprises a processor-readable storage medium having encoded therein executable code of one or more software programs, wherein the one or more software programs when executed by one or more processing devices implement the steps of (a) subjecting an ophthalmic device mold-forming material to drying conditions in a first inert gas environment for a time period sufficient to substantially dry the ophthalmic device mold-forming material; (b) molding a first ophthalmic device mold part and a second ophthalmic device mold part from the dried ophthalmic device mold-forming material; and (c) subjecting the first ophthalmic device mold part and the second ophthalmic device mold part to a second inert gas environment for a time period sufficient to substantially remove all oxygen in the first ophthalmic device mold part and the second ophthalmic device mold part.

BRIEF DESCRIPTION OF THE DRAWINGS

Exemplary embodiments of the present invention will be described below in more detail, with reference to the accompanying drawings, of which.

DETAILED DESCRIPTION

Figure 1:
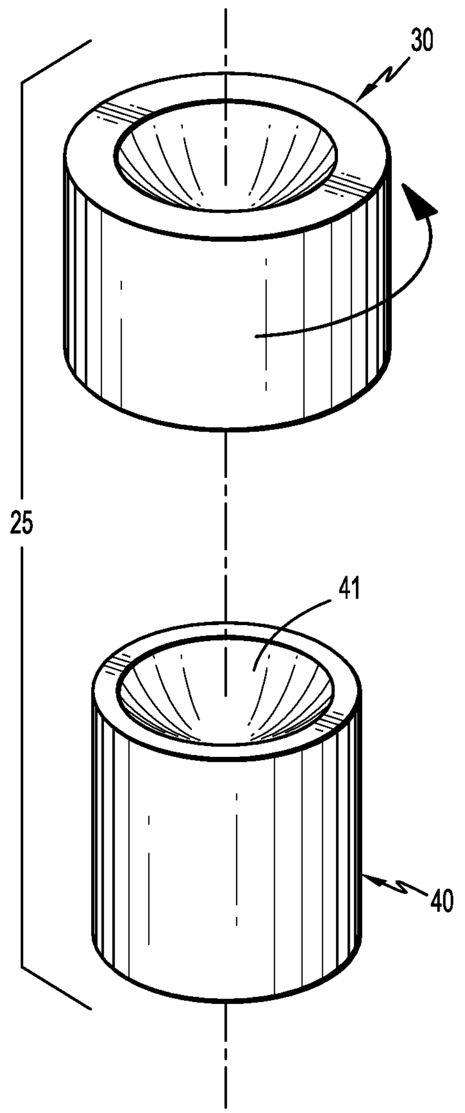
FIG. 1 is a schematic exploded view of a representative mold assembly according to an illustrative embodiment.

Illustrative embodiments will be described herein with reference to exemplary methods and systems for making molds for production of ophthalmic devices such as soft contact lenses. It is to be appreciated, however, that embodiments described herein are not restricted to use with the particular illustrative method and system shown.

In the process of preparing high-volume ophthalmic devices, the presence of oxygen in normal atmospheric conditions can lead to inhibition of, and thus incomplete and non-homogenous curing of the reactive monomeric mixture at the surface of the ophthalmic device. This, in turn, can adversely alter physical properties of the ophthalmic device such as, for example, the captive bubble contact angle. The presence of oxygen typically requires that the molds used for making the ophthalmic devices be degassed for a minimum of about 8 to about 12 hours prior to the casting and curing of the monomeric mixture. This degassing time is required to remove any absorbed and adsorbed oxygen on the mold surface. Without this degassing time, the resulting ophthalmic device exhibits poor surface properties such as contact angle, and in addition, can prevent the de-molding of the ophthalmic device from the mold.

The method and system described herein advantageously reduce the degassing time from a degassing time of about 8 to about 12 hours to a degassing time of about 30 minutes to about 2 hours. This is accomplished by, for example, at least subjecting an ophthalmic device mold-forming material to drying conditions in an inert gas environment for a time period sufficient to substantially dry the ophthalmic device mold-forming material prior to degassing the mold parts. Accordingly, the resulting ophthalmic devices formed from this method can achieve a similar lens low contact angle (CBCA) in significantly less time than ophthalmic devices produced under the normal process of degassing the mold parts for about 8 to about 12 hours.

Exemplary embodiments will now be discussed in further detail with regard to a mold assembly for the production of ophthalmic devices. As used herein, the terms "ophthalmic device" and "lens" refer to devices that reside in or on the eye. These devices can provide optical correction, wound care, drug delivery, diagnostic functionality, cosmetic enhancement or any combination of these properties. Representative examples of such devices include, but are not limited to, soft contact lenses, e.g., soft, hydrogel lenses, soft, non-hydrogel lenses and the like, intraocular lenses, overlay lenses, ocular inserts, optical inserts, bandage lenses and therapeutic lenses and the like. As is understood by one skilled in the art, a lens is considered to be "soft" if it can be folded back upon itself without breaking. The ophthalmic devices such as high-water content contact lenses of the illustrative embodiments can be spherical, toric, bifocal, and may contain cosmetic tints, opaque cosmetic patterns, combinations thereof and the like.

Figure 2:
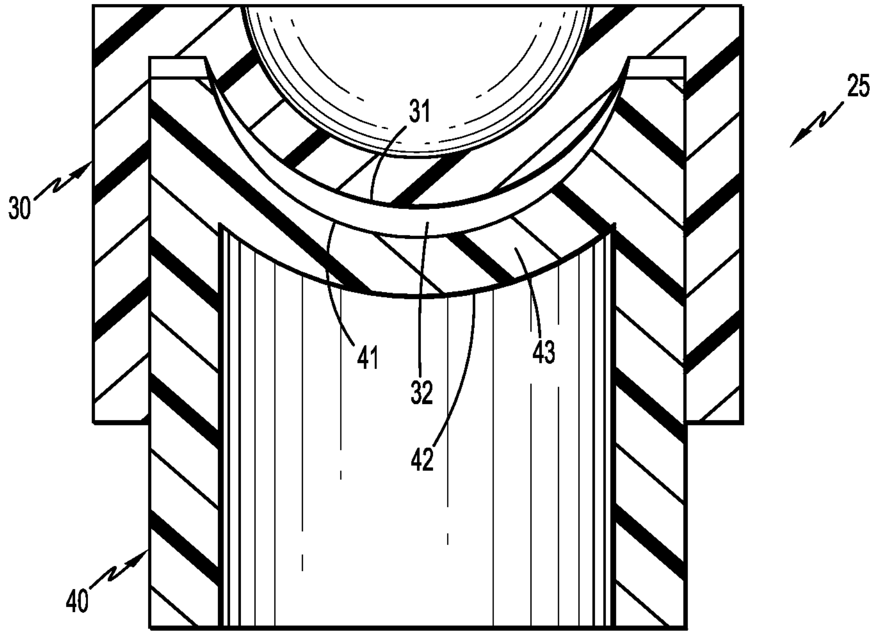
FIG. 2 is a schematic cross-sectional view of the mold assembly of FIG. 1 assembled for cast molding a contact lens according to an illustrative embodiment.

In an illustrative embodiment, a mold assembly described herein will include at least a mate-able pair of mold parts. A representative example of a mold assembly for use herein is generally depicted as mold assembly 25 in FIGS. 1 and 2. In particular, the mold assembly 25 includes posterior mold 30 having a posterior mold cavity defining surface 31 (which forms the posterior surface of the molded lens), and anterior mold 40 having an anterior mold cavity defining surface 41 (which forms the anterior surface of the molded lens). When the mold sections are assembled, a mold cavity 32 is formed between the two defining surfaces that correspond to the desired shape of the contact lens molded therein. As seen in FIGS. 1 and 2, anterior mold 40 includes surface 42 opposed to anterior mold cavity defining surface 41, surfaces 41 and 42 defining segment 43 therebetween of anterior mold 40. Opposed surface 42 of anterior mold 40 does not contact the polymerizable lens mixture in casting contact lenses, i.e., opposed surface 42 does not form part of mold cavity 32.

Figure 3:
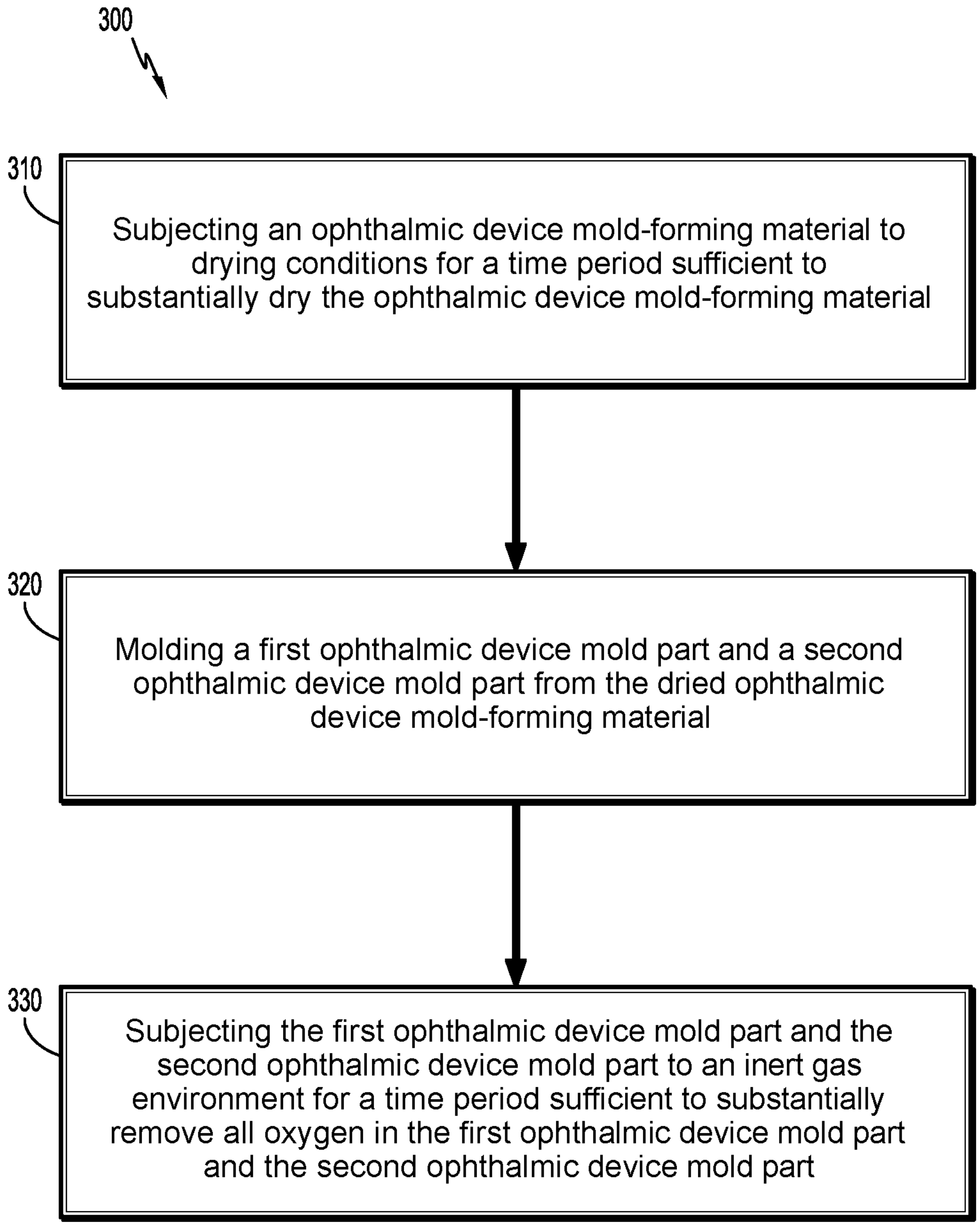
FIG. 3 illustrates a flow diagram of a process for making a mold assembly, according to one or more illustrative embodiments.

An illustrative embodiment of a method and system for making the mold assembly will now be described with reference to the flow diagram of FIG. 3. In particular, FIG. 3 shows method 300 in which step 310 involves subjecting an ophthalmic device mold-forming material to drying conditions in an inert gas environment for a time period sufficient to substantially dry the ophthalmic device mold-forming material. The drying of the ophthalmic device mold-forming material can include, for example, supercritical drying, subcritical drying, thermal drying, evaporative air drying, vacuum drying, or any combination thereof In one illustrative embodiment, the ophthalmic device mold-forming material is vacuum dried.

In an illustrative embodiment, the ophthalmic device mold-forming material can be dried, for example, by vacuum drying, for a time period ranging from about 0.25 hours to about 8 hours, and at a pressure ranging from about 10 mm Hg to about 125 mm Hg. In another illustrative embodiment, the ophthalmic device mold-forming material is vacuum dried for a time period ranging from about 0.5 hours to about 2 hours, and at a pressure ranging from about 15 mm Hg to about 50 mm Hg. The drying can take place in an inert gas environment such as a nitrogen gas environment. Typically, the dried ophthalmic device mold-forming material is maintained in the inert gas environment until the step of molding the first and second ophthalmic device mold parts as described below.

In one illustrative embodiment, the ophthalmic device mold-forming material can be heated before, or during, drying to a temperature of at least about 60 °C. In one illustrative embodiment, the ophthalmic device mold-forming material can be heated to a temperature of from about 60 °C to about 100 °C.

The ophthalmic device mold-forming material is generally made of a plastic material which provides the specific physical characteristics to the lens. Suitable plastic material includes, for example, thermoplastic resins which generally have a relatively high oxygen permeability. In one illustrative embodiment, an ophthalmic device mold-forming material includes, for example, polymers and copolymers which contain predominantly polyolefins. Suitable polyolefins include, for example, polyethylene, polypropylene, polystyrene and the like and mixtures thereof. In one illustrative embodiment, the plastic mold material is polypropylene.

In another illustrative embodiment, an ophthalmic device mold-forming material includes, for example, cyclic block copolymers. Suitable cyclic block copolymers include, for example, styrene-based cyclic block copolymers such as styrene-conjugated diene cyclic block copolymers and fully hydrogenated styrene-conjugated diene block copolymers. In one embodiment, a cyclic block copolymer can be a non-hydrogenated or fully hydrogenated styrene-butadiene copolymer as illustrated below.

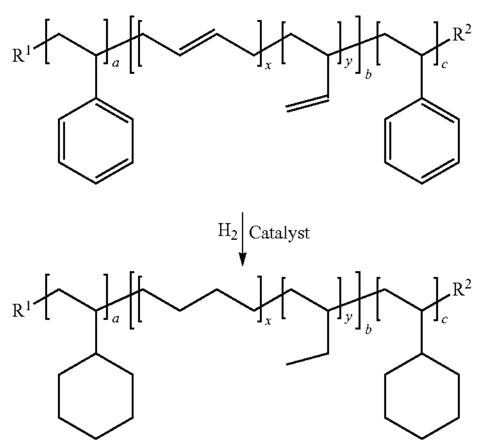

The styrene-butadiene copolymers can be made by methods known in the art or commercially available as, for example, a ViviOn™ 8210 cyclic block copolymer from USI Corporation (Kaohsiung City, Taiwan). The cyclic block copolymers such as the foregoing non-hydrogenated or hydrogenated styrene-butadiene copolymer can have a weight average molecular weight ranging from about 100,000 to about 900,000 Daltons.

The ophthalmic device forming materials can be in such forms as, for example, a material film, a melt pellet or a hot melt. Each of the forms will be discussed as follows.

Films—a material film can be prepared by the following two methods: (i) film extrusion or (ii) compression molding. In the case of film extrusion, material pellets of the ophthalmic device forming materials are fed into an extruder and the molten material is forced through a slit die and cooled into a film. In the case of compression molding, material pellets of the ophthalmic device forming materials are melted at a temperature between about 100 °C to about 150 °C in a single or twin-screw extruder or co or counter rotating heated kneader (such as a Banbury or Brabender mixer). In this process, the melt is extruded onto a plate, then capped with a second plate and pressed in a heated Carver press at about 135 °C under 7000 psi for approximately 10 minutes to produce a film thickness of about 200 to about 1000 microns. A relatively small portion, for example, approximately 10×10 mm, of this film is then placed onto the bottom cavity of the mold machine. The top cavity is then aligned and pressed down onto the film forming the lens.

Melt pellets—Melt pellets can be prepared by melting the material pellets of the ophthalmic device forming materials in a single screw extruder and then forced through an orifice that is approximately 25% smaller than the desired diameter of the melt pellet. When the material extrudes from the orifice, a die face knife is used to cut the molten ball of material. In this way a melt pellet is produced and can be delivered into the molding cavity for subsequent compression molding into a lens.

Hot melt—In this process, the material pellets are melted in an extruder or heated cylinder and the melt is then forced through an orifice approximately 0.1 to 2 mm in diameter (preferably 0.5 to 1 mm in diameter) using either a piston or compressed air. This produces a small melt bead that is directly dropped or sprayed onto the mold cavity followed by subsequent compression molding into a lens.

FIG. 3 further shows method 300 in which step 320 involves molding a first ophthalmic device mold part and a second ophthalmic device mold part, i.e., a posterior mold part and an anterior mold part, from the dried ophthalmic device mold-forming material of step 310 to form a mold assembly as described above with respect to FIGS. 1 and 2. In an illustrative embodiment, the first ophthalmic device mold part and the second ophthalmic device mold part (i.e., the anterior mold and posterior mold) are injection molded from the dried ophthalmic device mold-forming material in any suitable injection molding apparatus known in the art.

FIG. 3 further shows method 300 in which step 330 involves subjecting the first ophthalmic device mold part and the second ophthalmic device mold part produced in step 320 in an inert gas environment for a time period sufficient to substantially remove all oxygen present in the first ophthalmic device mold part and the second ophthalmic device mold part. In an illustrative embodiment, the first and second ophthalmic device mold parts are degassed in a nitrogen gas environment. The time period for degassing the first and second ophthalmic device mold parts can range from about 2 hours to about 8 hours. In one embodiment, the time period for degassing the first and second ophthalmic device mold parts can range from about 2 hours to about 4 hours. After exposing the first and second ophthalmic device mold parts to the inert gas environment such as nitrogen, the oxygen level at their surfaces is within tolerance limits, and usually is essentially zero within instrument capability, e.g., an oxygen content below about 1 wt. %, or less than about 0.5 wt. % or less than about 0.01 wt. %.

The mold assemblies described herein are particularly useful for improving the surface quality of contact lenses manufactured by, for example, cast molding processes using free radical polymerization techniques. Generally, the monomeric mixtures for forming contact lenses, the molding process, and polymerization processes are well known and this invention is concerned primarily with forming the mold assembly to achieve contact lenses with improved surface characteristics. In addition, the resulting mold assemblies of the illustrative embodiments described herein can also be used to improve surface quality with any free radical polymerization process using the mold parts made herein to provide a predetermined shape to the final polymerized product.

The mold assemblies described herein can be used for making any ophthalmic device, and the monomeric mixture and the specific monomers used to form the ophthalmic devices are not critical. In one embodiment, the mold assemblies described herein are employed for making soft contact lenses such as those commonly referred to as hydrogel lenses, e.g., silicone hydrogel lenses, prepared from silicone and/or non-silicone monomers including, but not limited to, hydroxyethyl methacrylate, N-vinyl-pyrrolidone, glycerol methacrylate, methacrylic acid and acid esters. However, any combination of lens forming monomers in a monomeric mixture capable of forming a polymer useful in making contact lenses may be used. Hydrophobic lens forming monomers may also be included such as those containing silicone moieties. The degree of polymerization and/or the crosslinking density at the surface of the lens is believed to be improved in all contact lenses, even those which do not typically exhibit cosmetic defects.

In one embodiment, an ophthalmic device obtained herein includes devices which are formed from material not hydrophilic per se. Such devices are formed from materials known in the art and include, by way of example, polysiloxanes, perfluoropolyethers, fluorinated poly(meth)acrylates or equivalent fluorinated polymers derived, e.g., from other polymerizable carboxylic acids, polyalkyl(meth)acrylates or equivalent alkylester polymers derived from other polymerizable carboxylic acids, or fluorinated polyolefins, such as fluorinated ethylene propylene polymers, or tetrafluoroethylene, preferably in combination with a dioxol, e.g., perfluoro-2,2-dimethyl-1,3-dioxol. Representative examples of suitable bulk materials include, but are not limited to, lotrafilcon A, neofocon, pasifocon, telefocon, fluorsilfocon, paflufocon, silafocon, elastofilcon, fluorofocon or Teflon™ AF materials, such as Teflon™ AF 1600 or Teflon™ AF 2400 which are copolymers of about 63 to about 73 mol % of perfluoro-2,2-dimethyl-1,3-dioxol and about 37 to about 27 mol % of tetrafluoroethylene, or of about 80 to about 90 mol % of perfluoro-2,2-dimethyl-1,3-dioxol and about 20 to about 10 mol % of tetrafluoroethylene.

In another embodiment, an ophthalmic device obtained herein includes a device which is formed from material hydrophilic per se, since reactive groups, e.g., carboxy, carbamoyl, sulfate, sulfonate, phosphate, amine, ammonium or hydroxy groups, are inherently present in the material and therefore also at the surface of an ophthalmic device manufactured therefrom. Such devices are formed from materials known in the art and include, by way of example, polyhydroxyethyl acrylate, polyhydroxyethyl methacrylate (HEMA), polyvinyl pyrrolidone (PVP), polyacrylic acid, polymethacrylic acid, polyacrylamide, polydimethylacrylamide (DMA), polyvinyl alcohol and the like and copolymers thereof, e.g., from two or more monomers selected from hydroxyethyl acrylate, hydroxyethyl methacrylate, N-vinyl pyrrolidone, acrylic acid, methacrylic acid, acrylamide, dimethyl acrylamide, vinyl alcohol and the like.

Representative examples of suitable bulk materials include, but are not limited to, polymacon, tefilcon, methafilcon, deltafilcon, bufilcon, phemfilcon, ocufilcon, focofilcon, etafilcon, hefilcon, vifilcon, tetrafilcon, perfilcon, droxifilcon, dimefilcon, isofilcon, mafilcon, nelfilcon, atlafilcon and the like. Examples of other suitable bulk materials include samfilcon A, balafilcon A, hilafilcon A, alphafilcon A, bilafilcon B and the like.

In another embodiment, an ophthalmic device obtained herein includes a device which is formed from materials which are amphiphilic segmented copolymers containing at least one hydrophobic segment and at least one hydrophilic segment which are linked through a bond or a bridge member.

It is particularly useful to employ biocompatible materials herein including both soft and rigid materials commonly used for ophthalmic lenses, including contact lenses. In general, non-hydrogel materials are hydrophobic polymeric materials that do not contain water in their equilibrium state. Typical non-hydrogel materials comprise silicone acrylics, such as those formed from a bulky silicone monomer (e.g., tris(trimethylsiloxy)silylpropyl methacrylate, commonly known as "TRIS" monomer), methacrylate end-capped poly(dimethylsiloxane)prepolymer, or silicones having fluoroalkyl side groups (polysiloxanes are also commonly known as silicone polymers).

Hydrogels in general are a well-known class of materials that comprise hydrated, crosslinked polymeric systems containing water in an equilibrium state. Accordingly, hydrogels are copolymers prepared from hydrophilic monomers. In the case of silicone hydrogels, the hydrogel copolymers are generally prepared by polymerizing a mixture containing at least one device-forming silicone-containing monomer and at least one device-forming hydrophilic monomer. Either the silicone-containing monomer or the hydrophilic monomer can function as a crosslinking agent (a crosslinker being defined as a monomer having multiple polymerizable functionalities) or a separate crosslinker may be employed. Silicone hydrogels typically have a water content between about 10 to about 80 weight percent.

Representative examples of useful hydrophilic monomers include, but are not limited to, amides such as N,N-dimethylacrylamide and N,N-dimethylmethacrylamide; cyclic lactams such as N-vinyl-2-pyrrolidone; and (meth)acrylated poly(alkene glycols), such as poly(diethylene glycols) of varying chain lengths containing monomethacrylate or dimethacrylate end caps. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277, the disclosures of which are incorporated herein by reference. Other suitable hydrophilic monomers will be apparent to one skilled in the art. For example, 2-hydroxyethylmethacrylate (HEMA) is a well-known hydrophilic monomer that may be used in admixture with the aforementioned hydrophilic monomers.

The monomer mixtures may also include a second device-forming monomer including a copolymerizable group and a reactive functional group. The copolyermizable group is preferably an ethylenically unsaturated group, such that this device-forming monomer copolymerizes with the hydrophilic device-forming monomer and any other device-forming monomers in the initial device-forming monomer mixture. Additionally, the second monomer can include a reactive functional group that reacts with a complementary reactive group of the copolymer which is the reaction product of one or more polymerizable polyhydric alcohols and one or more polymerizable fluorine-containing monomers. In other words, after the device is formed by copolymerizing the device-forming monomer mixture, the reactive functional groups provided by the second device-forming monomers remain to react with a complementary reactive moiety of the copolymer.

In one embodiment, reactive groups of the second device-forming monomers include epoxide groups. Accordingly, second device-forming monomers are those that include both an ethylenically unsaturated group (that permits the monomer to copolymerize with the hydrophilic device-forming monomer) and the epoxide group (that does not react with the hydrophilic device-forming monomer but remains to react with the copolymer is the reaction product of one or more polymerizable polyhydric alcohols and one or more polymerizable fluorine-containing monomers). Examples include glycidyl methacrylate, glycidyl acrylate, glycidyl vinylcarbonate, glycidyl vinylcarbamate, 4-vinyl-1-cyclohexene-1,2-epoxide and the like.

As mentioned, one class of ophthalmic device substrate materials are silicone hydrogels. In this case, the initial device-forming monomer mixture further comprises a silicone-containing monomer. Applicable silicone-containing monomeric materials for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995. Specific examples of suitable materials for use herein include those disclosed in U.S. Patent Nos. 5,310,779; 5,387,662; 5,449,729; 5,512,205; 5,610,252; 5,616,757; 5,708,094; 5,710,302; 5,714,557 and 5,908,906, the contents of which are incorporated by reference herein.

Representative examples of applicable silicone-containing monomers include bulky polysiloxanylalkyl(meth)acrylic monomers. An example of a bulky polysiloxanylalkyl(meth)acrylic monomer is represented by the structure of Formula I:

(I)

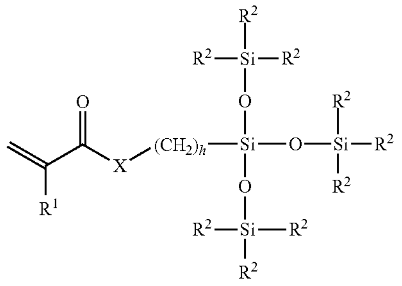

wherein X denotes —O— or —NR— wherein R denotes hydrogen or a $C_1$ to $C_4$ alkyl; each $R^1$ independently denotes hydrogen or methyl; each $R^2$ independently denotes a lower alkyl radical, phenyl radical or a group represented by

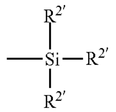

wherein each $R^{2'}$ independently denotes a lower alkyl or phenyl radical; and h is 1 to 10.

Examples of bulky monomers are methacryloxypropyl tris(trimethyl-siloxy)silane or tris(trimethylsiloxy)silylpropyl methacrylate, sometimes referred to as TRIS and tris (trimethylsiloxy)silylpropyl vinyl carbamate, sometimes referred to as TRIS-VC, and the like.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, for example, silicone-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris (trim ethylsiloxy)silyl]propyl ally carbamate; 3-[tris(trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like and mixtures thereof.

Another class of silicone-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," Journal of Applied Polymer Science, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae II and III:

$$E(*D*A*D*G)_a *D*A*D*E'; \text{ or} \quad \text{(II)}$$

$$E(*D*G*D*A)_a *D*A*D*E'; \text{ or} \quad \text{(III)}$$

wherein:

D independently denotes an alkyl diradical, an alkyl cycloalkyl diradical, a cycloalkyl diradical, an aryl diradical or an alkylaryl diradical having 6 to about 30 carbon atoms;

G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

denotes a urethane or ureido linkage;

a is at least 1;

A independently denotes a divalent polymeric radical of Formula IV:

(IV)

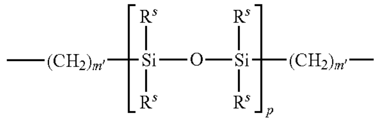

wherein each $R^S$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula V:

(V)

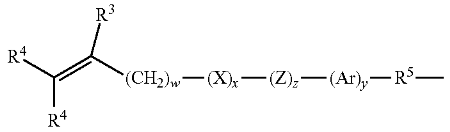

wherein: $R^3$ is hydrogen or methyl;

$R^4$ is hydrogen, an alkyl radical having 1 to 6 carbon atoms, or a —CO—Y—$R^6$ radical wherein Y is —O—, —S— or —NH—;

$R^5$ is a divalent alkylene radical having 1 to about 10 carbon atoms;

$R^6$ is a alkyl radical having 1 to about 12 carbon atoms;

X denotes —CO— or —OCO—;

Z denotes —O— or —NH—;

Ar denotes an aromatic radical having about 6 to about 30 carbon atoms;

w is 0 to 6; x is 0 or 1; y is 0 or 1; and z is 0 or 1.

In one embodiment, a silicone-containing urethane monomer is represented by Formula VI:

(VI)

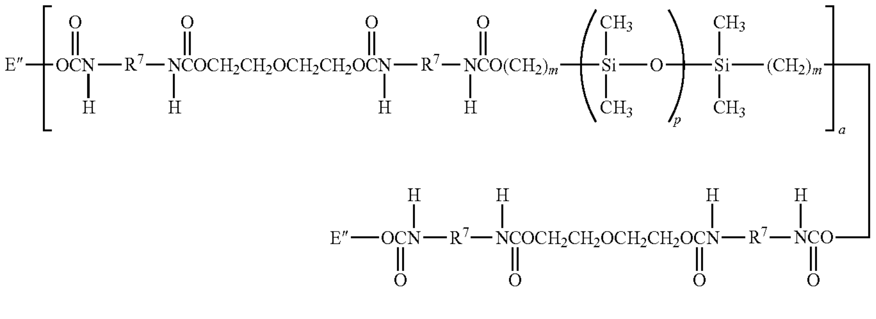

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E" is a group represented by:

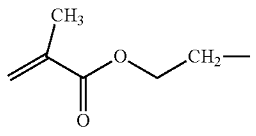

In another embodiment, a silicone hydrogel material comprises (in bulk, that is, in the monomer mixture that is copolymerized) about 5 to about 50 percent, or from about 10 to about 25 percent, by weight of one or more silicone macromonomers, about 5 to about 75 percent, or about 30 to about 60 percent, by weight of one or more polysiloxanyl-alkyl (meth)acrylic monomers, and about 10 to about 50 percent, or about 20 to about 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 discloses additional unsaturated groups, including acryloxy or methacryloxy. Fumarate-containing materials such as those disclosed in U.S. Pat. Nos. 5,310,779; 5,449,729 and 5,512,205 are also useful substrates in accordance with the embodiments described herein. The silane macromonomer may be a silicone-containing vinyl carbonate or vinyl carbamate or a polyurethane-polysiloxane having one or more hard-soft-hard blocks and end-capped with a hydrophilic monomer.

Another class of representative silicone-containing monomers includes fluorinated monomers. Such monomers have been used in the formation of fluorosilicone hydrogels to reduce the accumulation of deposits on contact lenses made therefrom, as disclosed in, for example, U.S. Pat. Nos. 4,954,587; 5,010,141 and 5,079,319. Also, the use of silicone-containing monomers having certain fluorinated side groups, i.e., $-(CF_2)-H$, have been found to improve compatibility between the hydrophilic and silicone-containing monomeric units. See, e.g., U.S. Pat. Nos. 5,321,108 and 5,387,662.

The above silicone materials are merely exemplary, and other materials that have been disclosed in various publications and are being continuously developed for use in making ophthalmic devices such as contact lenses and other medical devices can also be used. For example, an ophthalmic device can be formed from at least a cationic monomer such as cationic silicone-containing monomer or cationic fluorinated silicone-containing monomers.

The monomeric mixtures used in forming the ophthalmic devices obtained with the mold assemblies described herein can also include crosslinking agents, strengthening agents, free radical initiators and/or catalysts and the like as is well known in the art. Further, suitable solvents or diluents can be employed in the monomer mix, provided such solvents or diluents do not adversely affect or interfere with the polymerization process.

The method of polymerization or cure is not critical to the practice of this invention. Thus, the polymerization can occur by a variety of mechanisms depending on the specific composition employed. For example, thermal, photo, X-ray, microwave, and combinations thereof which are free radical polymerization techniques can be employed herein. In one illustrative embodiment, thermal and photo polymerizations are used. In another illustrative embodiment, a light cure is used.

In general, the molded lenses are formed by depositing a curable liquid such as a polymerizable monomer(s) and/or macromer(s) into a mold cavity of the mold section of the mold assembly described herein, curing the liquid into a solid state, opening the mold cavity and removing the lens. Other processing steps such as hydration of the lens can then be performed. Cast molding techniques are also well known. Examples of cast molding processes are disclosed in U.S. Pat. Nos. 4,113,224; 4,121,896; 4,208,364; and 4,208,365, the contents of which are incorporated herein by reference. Of course, many other cast molding teachings are available which can be used herein.

The resulting ophthalmic device obtained herein can then be packaged by immersing the ophthalmic device in an aqueous packaging solution prior to delivery to the customer/wearer, directly following manufacture of the ophthalmic device. Alternately, the packaging and storing in the packaging solution may occur at an intermediate point before delivery to the ultimate customer (wearer) but following manufacture and transportation of the ophthalmic device in a dry state, wherein the dry ophthalmic device is hydrated by immersing the ophthalmic device in the packaging solution. Consequently, a package for delivery to a customer may include a sealed container containing one or more unused ophthalmic devices immersed in an aqueous packaging solution.

Figure 4:
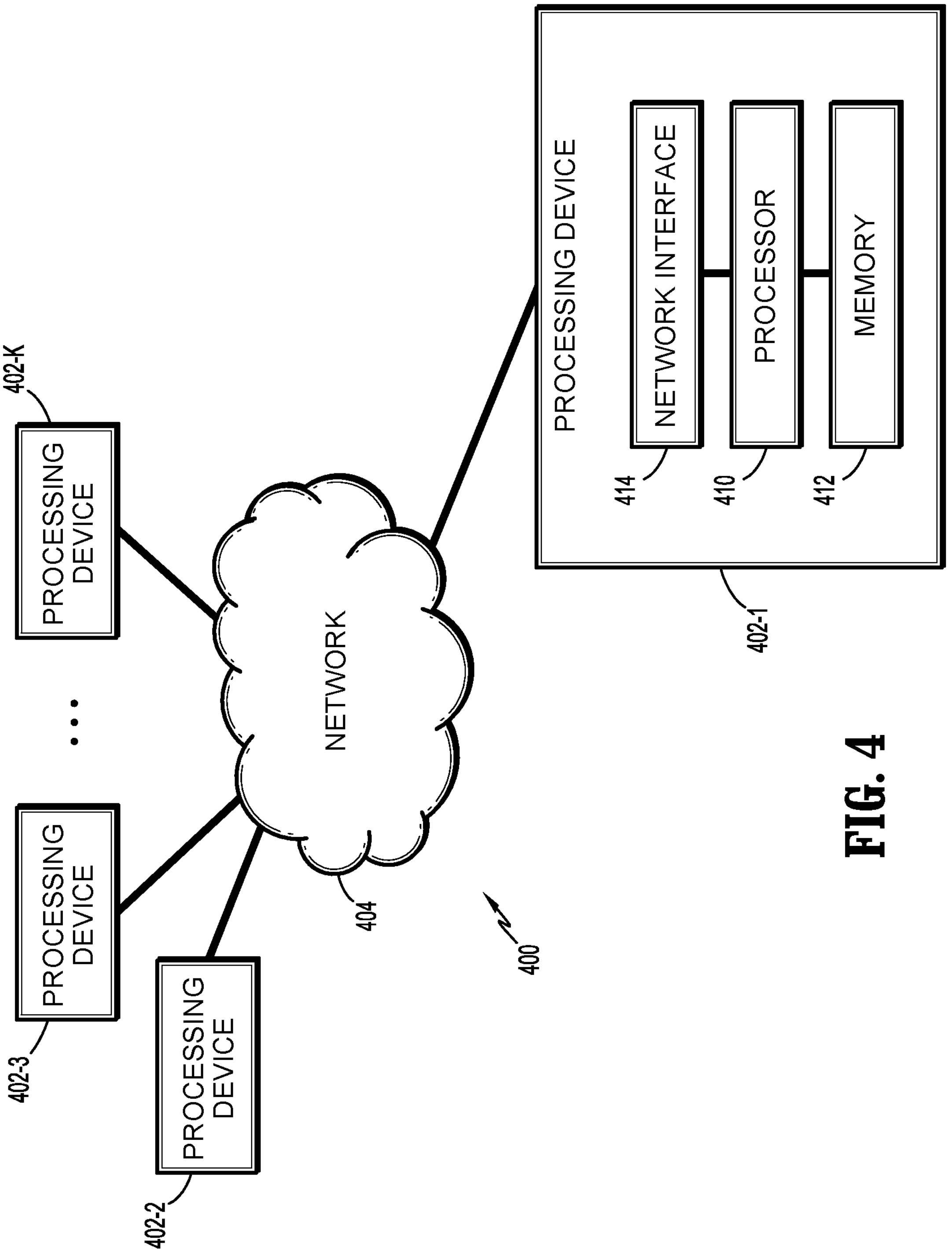
FIG. 4 shows an example of a processing platform that may be utilized in a system to implement the steps of the method in an illustrative embodiment.

As is apparent from the above, the method described herein can be run on a system to carry out the steps of the method for making the mold assemblies and resulting ophthalmic devices. In general, the system can include at least one or more of processing modules or other components of the system which may each run on a computer, server, storage device or other processing platform element. A given such element may be viewed as an example of what is more generally referred to herein as a “processing device.” An example of a processing platform is processing platform 400 shown in FIG. 4.

The processing platform 400 in this embodiment comprises a portion of the system and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 412 may comprise random access memory (RAM), read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and the system may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of a system as disclosed herein to carry out the steps of the method for making the mold assemblies and resulting ophthalmic devices can be implemented at least in part in the form of one or more software programs stored in memory and executed by a processor of a processing device. For example, at least portions of the functionality for making the mold assemblies and resulting ophthalmic devices as disclosed herein are illustratively implemented in the form of software running on one or more processing devices.

The following examples are provided to enable one skilled in the art to practice the invention and are merely illustrative of the invention. The examples should not be read as limiting the scope of the invention as defined in the claims. In the examples, the following abbreviations are used.

Contact Angle (CBCA): Captive bubble contact angle data was collected on a First Ten Angstroms FTA-1000 drop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70 to 72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high-speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

EXAMPLES 1-4

Polypropylene pellets were fed into a vacuum drier which consisted of three discrete chambers. The polypropylene pellets were placed in the first chamber and air heated to 82 °C was passed through the chamber for 30 minutes, heating up the resin. The polypropylene pellets were then automatically transferred to a second chamber where vacuum was applied at 25 mmHg for 30 minutes to remove any moisture present from the polypropylene pellets. After the vacuum time was completed, the dried pellets were transferred to a retention hopper chamber where the pellets were held under nitrogen. The pellets were then transferred via a tube containing nitrogen to the hopper on an injection mold machine. The hopper was also under nitrogen. The pellets were then injection molded between optical and non-optical tools within the mold base to form the anterior and posterior molds. The anterior mold part and posterior mold part were then placed in an oxygen reduction environment chamber and exposed to nitrogen for a time period (ODE time) of 2, 4, 6 and 8 hours, respectively.

The degassed anterior mold part and posterior mold part were removed from the chamber. Next, samfilcon A silicone hydrogel contact lens-forming monomeric mixture was cast into contact lenses by introducing the monomer mixture to the degassed anterior mold part and posterior mold part assembly. The mold assembly and monomer mixture were light cured to form contact lenses. The resultant contact lenses were released from the mold assembly and the contact angle (CBCA) was measured as set forth below in Table 1.

COMPARATIVE EXAMPLES 1 AND 2

A mold assembly and contact lens were prepared as described above for Examples 1-4, except the mold assembly of Comparative Example 1 was not vacuum dried, and the mold assembly of Comparative Example 2 was placed in the oxygen reduction environment chamber and exposed to nitrogen for a minimal time period of less than 15 minutes.

TABLE 1

| Comp. Ex./Ex. | Vacuum Drying Time (hours) | ODE Time (hours) | Contact Angle |
|---|---|---|---|
| Comp. Ex. 1 | 0 | 16 | 32.75 |
| Comp. Ex. 2 | 0.5 | minimal | 50.98 |
| Example 1 | 0.5 | 2 | 33.66 |
| Example 2 | 0.5 | 4 | 32.69 |
| Example 3 | 0.5 | 6 | 32.13 |
| Example 4 | 0.5 | 8 | 32.57 |

As can be seen the resulting contact lens prepared using the mold assemblies of Examples 1-4 had a comparable and significantly improved contact angle as compared to the resulting contact lens prepared using the mold assemblies of Comparative Examples 1 and 2.

EXAMPLES 5 AND 6

The polypropylene pellets were placed in the first chamber and air heated to 82 °C was passed through the chamber for 30 minutes, heating up the resin. The polypropylene pellets were then automatically transferred to a second chamber where vacuum was applied at 25 mmHg for 30 minutes and 60 minutes, respectively, to remove any moisture present from the polypropylene pellets. After the vacuum time was completed, the dried pellets were transferred to a retention hopper chamber where the pellets were held under nitrogen. The pellets were then transferred via a tube containing nitrogen to the hopper on an injection mold machine. The hopper was also under nitrogen. The pellets were then injection molded between optical and non-optical tools within the mold base to form the anterior and posterior molds. The anterior mold part and posterior mold part were then placed in an oxygen reduction environment chamber and exposed to nitrogen for a time period (ODE time) of 2 hours and 1.25 hours, respectively.

The degassed anterior mold part and posterior mold part were removed from the chamber. Next, samfilcon A silicone hydrogel contact lens-forming monomeric mixture was cast into contact lenses by introducing the monomer mixture to the degassed anterior mold part and posterior mold part assembly. The mold assembly and monomer mixture were light cured to form contact lenses. The resultant contact lenses were released from the mold assembly and the contact angle (CBCA) was measured as set forth below in Table 2.

COMPARATIVE EXAMPLE 3

A mold assembly and contact lens were prepared as described above for Examples 5 and 6, except the mold assembly of Comparative Example 3 was not vacuum dried, and was placed in the oxygen reduction environment chamber and exposed to nitrogen for 16 hours.

TABLE 2

| Comp. Ex./Ex. | Vacuum Drying Time (hours) | ODE Time (hours) | Contact Angle |
|---|---|---|---|
| Comp. Ex. 3 | 0 | 16 | 33.46 |
| Example 5 | 0.5 | 2 | 33.23 |
| Example 6 | 1.0 | 1.25 | 33.61 |

As can be seen the resulting contact lens prepared using the mold assemblies prepared in Examples 5 and 6 had a comparable contact angle as compared to the resulting contact lens prepared using the mold assembly of Comparative Example 3. In addition, when comparing Example 5 with Example 6, it is seen that by increasing the vacuum drying time from 30 minutes to 1 hour can reduce the ODE time by approximately 45 minutes.

EXAMPLES 7-10

Polypropylene pellets were fed into a vacuum drier which consisted of three discrete chambers. The polypropylene pellets were placed in the first chamber and air heated to 82 °C was passed through the chamber for 30 minutes, heating up the resin. The polypropylene pellets were then automatically transferred to a second chamber where vacuum was applied at 25 mmHg for 30 minutes to remove any moisture present from the polypropylene pellets. After the vacuum time was completed, the dried pellets were transferred to a retention hopper chamber where the pellets were held under nitrogen. The pellets were then transferred via a tube containing nitrogen to the hopper on an injection mold machine. The hopper was also under nitrogen. The pellets were then injection molded between optical and non-optical tools within the mold base to form the anterior and posterior molds. Next, the anterior mold part and posterior mold part were then exposed to air from 15, 30, 45 and 60 minutes, respectively. The anterior mold part and posterior mold part for each example were then placed in an oxygen reduction environment chamber and exposed to nitrogen for a time period (ODE time) of 2 hours.

The degassed anterior mold part and posterior mold part were removed from the chamber. Next, samfilcon A silicone hydrogel contact lens-forming monomeric mixture was then cast into contact lenses by introducing the monomer mixture to the degassed anterior mold part and posterior mold part assembly. The mold assembly and monomer mixture were light cured to form contact lenses. The resultant contact lenses were released from the mold assembly and the contact angle (CBCA) was measured as set forth below in Table 3.

COMPARATIVE EXAMPLE 4

A mold assembly and contact lens were prepared as described above for Examples 7-10, except the mold assembly of Comparative Example 4 was not vacuum dried.

TABLE 3

| Comp. Ex./Ex. | Vacuum Drying Time (hours) | Mold Time in Air (min) | ODE Time (hours) | Contact Angle |
|---|---|---|---|---|
| Comp. Ex. 4 | 0 | 15 | 16 | 33.27 |
| Example 7 | 0.5 | 15 | 2 | 33.65 |
| Example 8 | 0.5 | 30 | 2 | 33.79 |
| Example 9 | 0.5 | 45 | 2 | 34.85 |
| Example 10 | 0.5 | 60 | 2 | 35.29 |

As can be seen the resulting contact lens prepared using the mold assemblies of Examples 7-10 had a comparable and significantly improved contact angle as compared to the resulting contact lens prepared using the mold assembly of Comparative Example 4.

EXAMPLE 11

Pellets obtained from ViviOn™ 8210 cyclic block copolymer (USI Corporation) were fed into a vacuum drier which consisted of three discrete chambers. The pellets were placed in the first chamber and air heated to 82 °C was passed through the chamber for 30 minutes, heating up the resin. The pellets were then automatically transferred to a second chamber where vacuum was applied at 25 mmHg for 30 minutes to remove any moisture present from the pellets. After the vacuum time was completed, the dried pellets were transferred to a retention hopper chamber where the pellets were held under nitrogen. The pellets were then transferred via a tube containing nitrogen to the hopper on an injection mold machine. The hopper was also under nitrogen. The pellets were then injection molded between optical and non-optical tools within the mold base to form the anterior and posterior molds. The anterior mold part and posterior mold part were then placed in an oxygen reduction environment chamber and exposed to nitrogen for a time period (ODE time) of 2 hours.

The degassed anterior mold part and posterior mold part were removed from the chamber. Next, samfilcon A silicone hydrogel contact lens-forming monomeric mixture was cast into contact lenses by introducing the monomer mixture to the degassed anterior mold part and posterior mold part assembly. The mold assembly and monomer mixture were light cured to form contact lenses. The resultant contact lenses were released from the mold assembly and the contact angle (CBCA) was measured as set forth below in Table 4.

TABLE 4

| Ex. | Vacuum Drying Time (hours) | ODE Time (hours) | Contact Angle |
|---|---|---|---|
| Example 11 | 0.5 | 2 | 33.90 |

As can be seen the resulting contact lens prepared using the mold assembly of Example 11 had a comparable contact angle as compared to the resulting contact lens prepared using the mold assemblies described above obtained from polypropylene pellets.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present formulations and are disclosed herein just as if each and every such sub-combination was individually and explicitly disclosed herein.

It should again be emphasized that the above-described embodiments are presented for purposes of illustration only. Many variations and other alternative embodiments may be used. For example, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

(a) air heating, in a vacuum drier, an ophthalmic device mold-forming material to a temperature of 60 °C to 100 °C;

(b) vacuum drying, in the vacuum dryer, the ophthalmic device mold-forming material under drying conditions in a first inert gas environment for a time period of from about 30minutes to about 2 hours and at a pressure ranging from about 15 mm Hg to about 50 mm Hg to substantially dry the ophthalmic device mold-forming material, wherein the dried ophthalmic device mold-forming material is maintained in the first inert gas environment until step (c) of molding a first ophthalmic device mold part and a second ophthalmic device mold part;

(c) molding the first ophthalmic device mold part and the second ophthalmic device mold part from the dried ophthalmic device mold-forming material; and (d) subjecting the first ophthalmic device mold part and the second ophthalmic device mold part to a second inert gas environment for a time period from about 2 hours to about 8 hours to substantially remove all oxygen in the first ophthalmic device mold part and the second ophthalmic device mold part, wherein after step (d) the first ophthalmic device mold part and the second ophthalmic device mold part have an oxygen content of below about 1 wt. % as compared to a first ophthalmic device mold part and a second ophthalmic device mold part not subjected to steps (a) and (b).

2. The method of claim 1, further comprising:

(e) placing a predetermined amount of an ophthalmic device-forming monomeric mixture in the first ophthalmic device mold part and;

(f) assembling the first ophthalmic device mold part with the second ophthalmic device mold part with the ophthalmic device-forming monomeric mixture therebetween;

(g) polymerizing the ophthalmic device-forming monomeric mixture to form an ophthalmic device; and (h) disassembling the first ophthalmic device mold part from the second ophthalmic device mold part and releasing the ophthalmic device from either the first ophthalmic device mold part or the second ophthalmic device mold part.

3. The method of claim 2, wherein the first ophthalmic device mold part comprises a posterior mold section having a molding surface shaped to provide a posterior ophthalmic device surface and the second ophthalmic device mold part comprises an anterior mold section having a molding surface shaped to provide an anterior ophthalmic device surface.

4. The method of claim 1, wherein molding the first ophthalmic device mold part and the second ophthalmic device mold part from the dried ophthalmic device mold-forming material comprises injection molding the dried ophthalmic device mold-forming material.

5. The method of claim 1, wherein the ophthalmic device mold-forming material is one of a polyolefin or a cyclic block copolymer.

6. The method of claim 5, wherein the polyolefin is polypropylene.

7. The method of claim 5, wherein the cyclic block copolymer is a fully hydrogenated styrene-conjugated diene cyclic block copolymer.

8. The method of claim 1, wherein the ophthalmic device mold-forming material comprises one of a polymer film, a melt pellet and a hot melt.

9. The method of claim 1, wherein the first inert gas environment is a nitrogen gas environment.

10. The method of claim 1, wherein after step (d) the first ophthalmic device mold part and the second ophthalmic device mold part have an oxygen content of less than about 0.5 wt. %.

11. The method of claim 1, wherein after step (d) the first ophthalmic device mold part and the second ophthalmic device mold part have an oxygen content of less than about 0.01 wt. %.

12. The method of claim 1, wherein the second inert gas environment is a nitrogen gas environment.

13. The method of claim 1, wherein subjecting the first ophthalmic device mold part and the second ophthalmic device mold part to the second inert gas environment for the time period sufficient to substantially remove all oxygen in the first ophthalmic device mold part and the second ophthalmic device mold part comprises exposing the first ophthalmic device mold part and the second ophthalmic device mold part to a nitrogen gas environment for a time period ranging from about 2 hours to about 4 hours.

* * * * *